Nov. 22, 1955 H. JASIK 2,724,778

ELECTRICAL GENERATING DEVICE

Filed March 7, 1946

INVENTOR.
HENRY JASIK

BY M. O. Hayes

ATTORNEY 2,724,778

ELECTRICAL GENERATING DEVICE

Henry Jasik, United States Navy

Application March 7, 1946, Serial No. 652,747
5 Claims. (Cl. 250—36)
(Granted under Title 35, U. S. Code (1952), sec. 266)

This invention relates to magnetron-type electrical signal generating devices and more particularly to automatic frequency control of magnetron oscillation generating devices.

Magnetron oscillators generally are subject to frequency instability unless conditions of constant output loading and constant anode potential are maintained. In numerous applications it may be undesirable or difficult to maintain these conditions constant in which case some method of frequency control is necessary to prevent frequency instability.

Accordingly it is an object of this invention to provide a method of automatic frequency control of a magnetron oscillation generator.

Another object is to provide a magnetron oscillator system in which frequency instability is minimized.

A further object is to provide a system for electronic control of the frequency of a magnetron-type oscillator.

Other and further objects and features of the present invention will become apparent upon a careful consideration of the following detailed description when taken together with the accompanying drawings which illustrate a typical embodiment of the invention and the manner in which that embodiment may be considered to operate.

According to the general concept of the present invention, a frequency stabilization system is provided which maintains the output frequency of a magnetron oscillator substantially constant. To achieve the foregoing, a sample of the magnetron output signal is combined with a standard frequency signal producing a control signal in dependency upon the output frequency of the magnetron. The control signal is used in such a way as to vary the magnetic field intensity applied to the magnetron in accordance with the control signal. Thus, if the magnetron output frequency differs from the selected frequency, a control signal will be derived which will be applied to the magnetic field associated with the magnetron in such a way as to return the magnetron to the selected frequency.

Figure 1:
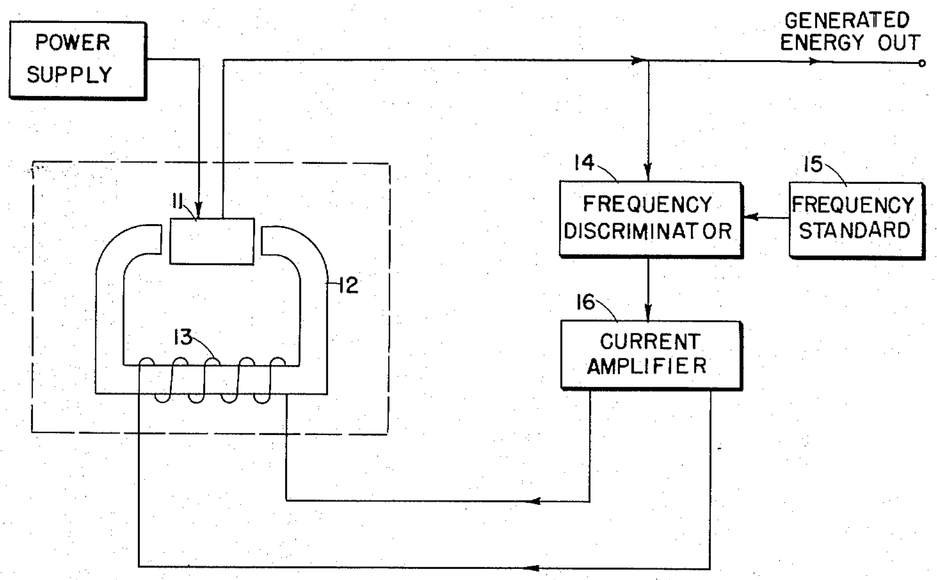
Fig. 1 is a block diagram showing one embodiment of the features of the present invention.

With reference to Fig. 1 a particular embodiment of the features of the present invention is shown as applied to the frequency stabilization of a magnetron-type oscillator. A magnetron oscillator indicated in the block 10 consists of magnetron 11, power connections to which are not shown, a magnet 12 adapted to apply a magnetic field to the magnetron 11, and a coil 13 adapted to vary the field intensity of the magnet in response to a control signal derived by a frequency discriminator 14. A portion of the magnetron output energy is applied to a frequency discriminator 14 together with a standard frequency signal originating in a frequency generator 15. Any conventional frequency generator which will produce a standard frequency signal may be used as the frequency generator 15.

The frequency discriminator 14 produces a control signal in dependency upon the difference between the frequencies of two signals applied thereto. Since one signal, that from the standard source 15 remains substantially constant, signals produced by the discriminator 14 will be dependent upon the operating frequency of the magnetron 11. The control signal produced by discriminator 14 is amplified in a current amplifier 16 and applied to a magnetron field intensity control coil 13. The control signal is fed to the control coil 13 in such a way as to compensate, by appropriate variation of the magnetic field applied to magnetron 11, whenever a tendency for frequency variation is present. The magnet supplying the field for the magnetron 11 and indicated by numeral 12 may be either a permanent magnet, in which case the coil 13 will supply only a portion of the magnetic field for the operation of the magnetron 11, or a structure of high permeability material in which the magnetic field required for the operation of the magnetron 11 is supplied entirely by the coil 13.

Figure 2:
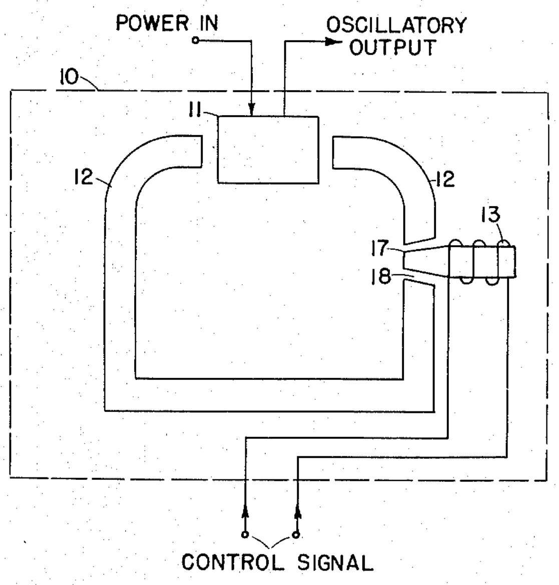
Fig. 2 shows an alternate arrangement of a component of the invention included in Figure 1.

An alternate arrangement of the magnetron oscillator components within block 10 is shown in Figure 2. This arrangement comprises magnetron 11, magnet 12, positioning coil 13 and a movable plug 17 for varying the reluctance of the magnetic path and consequently the intensity of the magnetic field applied to the magnetron 11. The control signal derived as in Fig. 1 in dependency on the difference between the magnetron frequency and the standard frequency from standard 15 is applied to the coil 13 to position plug 17 within a wedge shaped opening 18 in the magnet 12. Thus in a manner similar to that described in connection with Figure 1, automatic frequency stabilization of the magnetron oscillator is accomplished.

From the foregoing discussion it is apparent that considerable modification of the features of this invention are possible, and while the device herein described and the form of apparatus for the operation thereof, constitutes a preferred embodiment of the invention it is to be understood that the invention is not limited to this precise device and form of apparatus, and that changes made therein without departing from the scope of the invention which is defined in the appended claims.

The invention described herein may be manufactured and used by or for the Government of the United States of America for governmental purposes without the payment of any royalty thereon or therefor.

What is claimed is:

1. A system for controlling the frequency of a magnetron-type oscillator operating in a magnetic field, comprising a standard frequency source; frequency responsive means deriving a control signal in dependency on the frequency of the output signal of the magnetron oscillator relative to the frequency of said standard frequency source, and means varying the reluctance of the magnetic field path of said magnetron oscillator in accordance with said control signal to hold the magnetron oscillator frequency at a preselected value.

2. Apparatus for producing high power radio frequency electrical oscillations of substantially constant frequency, comprising, a magnetron-type high frequency oscillator, power supply means for the magnetron oscillator, magnetic field supply means for the magnetron oscillator, a low power standard frequency source, frequency selective means operative in response to the magnetron oscillator signal and the signal from the standard frequency source to produce a control signal in dependency on the frequency of the magnetron output signal, and means varying the reluctance of the magnetic field path of the magnetron oscillator to maintain the operation frequency thereof at a preselected value relative to that of the standard frequency source.

3. A frequency stabilized oscillation generator, comprising: a magnetron oscillator tube, a field magnet for said magnetron oscillator tube, reluctance control means for varying the reluctance of the magnetic field path of the field magnet to vary the magnetron operating frequency, frequency responsive means for deriving a control signal in dependency on the operative frequency of the magnetron oscillator tube, and a control signal path for applying control signals from the frequency responsive means to the reluctance control means.

4. A frequency stabilized oscillation generator, comprising: a magnetron oscillator tube, a variable air gap field magnet for said magnetron oscillator tube, frequency responsive means connected to said magnetron oscillator tube for deriving control signals in dependency on the operative frequency of the magnetron oscillator tube, and means for varying the length of the variable air gap in dependency on control signals to vary the operative frequency of the magnetron oscillator tube.

5. A system for controlling the frequency of a magnetron oscillator operating in a controlled magnetic field, comprising: a standard frequency source, frequency responsive means coupled to said magnetron oscillator and to said standard frequency source operable to derive a control signal in dependency on the frequency of the output signal of the magnetron oscillator relative to the frequency of said standard frequency source, and means operable to vary the intensity of the magnetic field applied to said magnetron oscillator in accordance with said control signal to hold the magnetron oscillator frequency fixed at a preselected value relative to said standard frequency source.

References Cited in the file of this patent

UNITED STATES PATENTS

| | | |
|---|---|---|
| 2,243,202 | Fritz | May 27, 1941 |
| 2,250,284 | Wendt | July 22, 1941 |
| 2,262,932 | Guanella | Nov. 18, 1941 |
| 2,268,366 | Wolff | Dec. 30, 1941 |
| 2,296,764 | Braden | Sept. 22, 1942 |
| 2,406,309 | Ziegler et al. | Aug. 20, 1946 |
| 2,462,294 | Thompson | Feb. 22, 1949 |
| 2,475,074 | Bradley et al. | July 5, 1949 |